(12) United States Patent
Shimomura et al.

(10) Patent No.: US 12,219,096 B2
(45) Date of Patent: Feb. 4, 2025

(54) MULTIPLE DWELLING HOUSE INTERPHONE SYSTEM

(71) Applicant: Aiphone Co., Ltd., Nagoya (JP)

(72) Inventors: Yuta Shimomura, Nagoya (JP);
Masashi Hattori, Nagoya (JP);
Kimiaki Fujishima, Nagoya (JP);
Ryoji Uno, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 441 days.

(21) Appl. No.: 17/652,736

(22) Filed: Feb. 28, 2022

(65) Prior Publication Data
US 2022/0286559 A1 Sep. 8, 2022

(30) Foreign Application Priority Data

Mar. 2, 2021 (JP) .................................. 2021-032839

(51) Int. Cl.
*H04M 3/54* (2006.01)
*G06F 3/14* (2006.01)
*H04N 7/18* (2006.01)

(52) U.S. Cl.
CPC .............. *H04M 3/543* (2013.01); *G06F 3/14* (2013.01); *H04N 7/183* (2013.01)

(58) Field of Classification Search
CPC .......... H04M 3/543; H04M 9/02; H04M 9/00; G06F 3/14; H04N 7/183
(Continued)

(56) References Cited

U.S. PATENT DOCUMENTS

| | | | | |
|---|---|---|---|---|
| 5,612,994 A | * | 3/1997 | Chen | H04N 7/186 379/167.12 |
| 7,783,018 B1 | * | 8/2010 | Goldberg | H04M 11/025 709/204 |

(Continued)

FOREIGN PATENT DOCUMENTS

| JP | H09-064989 A | 3/1997 |
|---|---|---|
| JP | 2004-088165 A | 3/2004 |

(Continued)

OTHER PUBLICATIONS

Viidex: "VX2200 Digital System "6 Wire" BUS Video—"2 Wire" BUS Audio," Oct. 15, 2016 (Oct. 15, 2016), pp. 1-20, XP055934229, Retrieved from the Internet: URL:https://www.videxuk.com/wp-content/uploads/2017/01/66251435-CSTS2220-EN-V1-1.pdf [retrieved on Jun. 22, 2022).

(Continued)

*Primary Examiner* — Maria El-Zoobi
(74) *Attorney, Agent, or Firm* — BURR PATENT LAW, PLLC

(57) ABSTRACT

A multiple dwelling house interphone system includes a collective entrance machine, a dwelling room master device, and a management master device. The management master device is installed in a manager room to speak with the visitor or the dweller. The multiple dwelling house interphone system has a reception mode in which a call to any dwelling unit from the collective entrance machine is uniformly transmitted to the management master device. The management master device includes a forwarding button and a forwarding control section. The forwarding button re-forwards a call in the reception mode to an original calling destination. The forwarding control section re-forwards the call to the dwelling room master device of a dwelling unit as the original calling destination when the forwarding button (Continued)

is operated when a speech path is formed with the collective entrance machine in response to the call forwarded in the reception mode.

9 Claims, 2 Drawing Sheets

(58) Field of Classification Search
USPC .......................................................... 348/14.2
See application file for complete search history.

(56) References Cited

U.S. PATENT DOCUMENTS

| | | | | |
|---|---|---|---|---|
| 7,899,437 | B2 * | 3/2011 | Baum ................ | H04M 1/72424 |
| | | | | 455/404.1 |
| 8,041,016 | B2 * | 10/2011 | Trell .................... | H04M 11/025 |
| | | | | 455/420 |
| 8,184,785 | B2 * | 5/2012 | Kuroda .................... | B66B 3/00 |
| | | | | 379/106.01 |
| 11,647,165 | B1 * | 5/2023 | Tso ........................ | H04N 7/186 |
| | | | | 348/143 |
| 2019/0253562 | A1 * | 8/2019 | Yamakawa ............. | H04M 9/02 |

FOREIGN PATENT DOCUMENTS

| | | | | |
|---|---|---|---|---|
| JP | 2006-101328 | A | 4/2006 | |
| JP | 2009-182638 | A | 8/2009 | |
| JP | 2009182638 | | * 8/2009 | .............. H04M 9/00 |

OTHER PUBLICATIONS

Extended European Search Report dated Jul. 15, 2022 (Application No. 22159237.1).

Japanese Office Action (with English translation) dated Oct. 22, 2024 (Application No. 2021-032839).

* cited by examiner

MULTIPLE DWELLING HOUSE INTERPHONE SYSTEM

TECHNICAL FIELD

The invention relates to a multiple dwelling house interphone system, especially relates to a multiple dwelling house interphone system that enables a primary response by a manager to a call by a visitor for a dweller.

BACKGROUND ART

In a multiple dwelling house interphone system, when a visitor operates a collective entrance machine installed at an entrance to perform a calling operation by selecting a dwelling unit as a visit destination, a dwelling room master device of a calling destination performs a calling operation. The dweller, recognizing it, performs a response operation of the dwelling room master device, thereby forming a speech path.

Such a conventional system includes a system with a forwarding function in which a call is forwarded to the manager room when a response cannot be made by the dweller because of his absence or the like and the manager can make a proxy response. An example can be found in JP 2006-101328 A.

In the above-described conventional system with the forwarding function, it is assumed that the dweller of the calling destination is absent, therefore, the system does not have a function of re-forwarding the call forwarded to the manager room to the original calling destination.

However, regardless of the presence or absence of the dweller, from a point of security, there is a need for a system in which a first call is uniformly received by a manager and then forwarded to an original calling destination. In this case, a function of re-forwarding the call to the original calling destination is indispensable.

Therefore, in consideration of the problem, it is an object of the disclosure to provide a multiple dwelling house interphone system that enables forwarding the first call to a manager room and re-forwarding the call to an original calling destination by a subsequent forwarding operation.

SUMMARY OF THE INVENTION

In order to solve the above-described matter, there is provided a multiple dwelling house interphone system according to a first aspect of the disclosure. The multiple dwelling house interphone system includes a collective entrance machine, a dwelling room master device, and a management master device. The collective entrance machine is installed at an entrance for a visitor to call a dweller. The dwelling room master device is installed in each dwelling unit for the dweller to respond to the call from the visitor. The management master device is installed in a manager room for the manager to speak with the visitor or the dweller. The multiple dwelling house interphone system has a reception mode in which a call to any dwelling unit from the collective entrance machine is uniformly transmitted to the management master device. The management master device includes a forwarding button and a forwarding control section. The forwarding button re-forwards a call in the reception mode to the original calling destination. The forwarding control section re-forwards the call to the dwelling room master device of a dwelling unit as the original calling destination when the forwarding button is operated in a state where a speech path is formed with the collective entrance machine in response to the call forwarded in the reception mode.

With this configuration, since the call from the collective entrance machine is uniformly forwarded to the manager room, the primary response can be performed by the manager, thereby allowing improvement of security such as a measure against a suspicious person. Then, since the call is forwarded from the management master device to the original calling destination by a simple operation of a forwarding button, the burden of the manager can be reduced to minimum without the bothersomeness of inputting the forwarding destination such as a room number.

In a second aspect of the disclosure, which is in the configuration according to the first aspect, when a response operation is performed by the dwelling room master device to which the call has been re-forwarded, the forwarding control section disconnects the speech path between the collective entrance machine and the management master device and forms a speech path between the dwelling room master device of a re-forwarding destination and the collective entrance machine.

With the configuration, when the response operation is performed by the dwelling room master device of the re-forwarding destination, since the speech path with the collective entrance machine is directly formed without initial connection with the management master device, the dweller receiving the call can smoothly respond to the call from the visitor.

In a third aspect of the disclosure, which is in the configuration according to the first or the second aspect, the collective entrance machine includes a display section that displays a calling destination. In the state where the call from the collective entrance machine is forwarded to the management master device, the collective entrance machine display section displays that the call is forwarded to the management master device. When the call is re-forwarded from the management master device to the original calling destination, dwelling unit information of the original calling destination is displayed.

With the configuration, when the call is forwarded in the reception mode, information on the forwarding destination is displayed on the collective entrance machine and subsequently, when the call is re-forwarded to the original calling destination, information on the dwelling unit is displayed. Therefore, the visitor may easily grasp the situation.

In a fourth aspect of the disclosure, which is in the configuration according to any of the first to the third aspects, the collective entrance machine includes a camera that takes a video image of a visitor, and the management master device includes a monitor that displays the video image taken by the camera. In the management master device to which the call has been forwarded in the reception mode, the video image taken by the camera is displayed on the monitor.

With this configuration, the manager can confirm the visitor by video even in the forwarded call, effectively improving the security.

In a fifth aspect of the disclosure, which is in the configuration according to any of the first to the fourth aspects, the management master device includes a display section that displays the dwelling unit information of the original calling destination when the call is forwarded in the reception mode.

With the configuration, the manager can obtain the calling destination of the visitor, and easily deal with it.

According to the disclosure, since the call from the collective entrance machine is uniformly forwarded to the manager room, the primary response can be performed by the manager, thereby allowing improvement of security such as a measure against a suspicious person. Since the call is forwarded from the management master device to the original calling destination by a simple operation of a forwarding button, the burden of the manager can be reduced to a minimum without the troublesomeness of inputting the forwarding destination.

DETAILED DESCRIPTION

Figure 1:
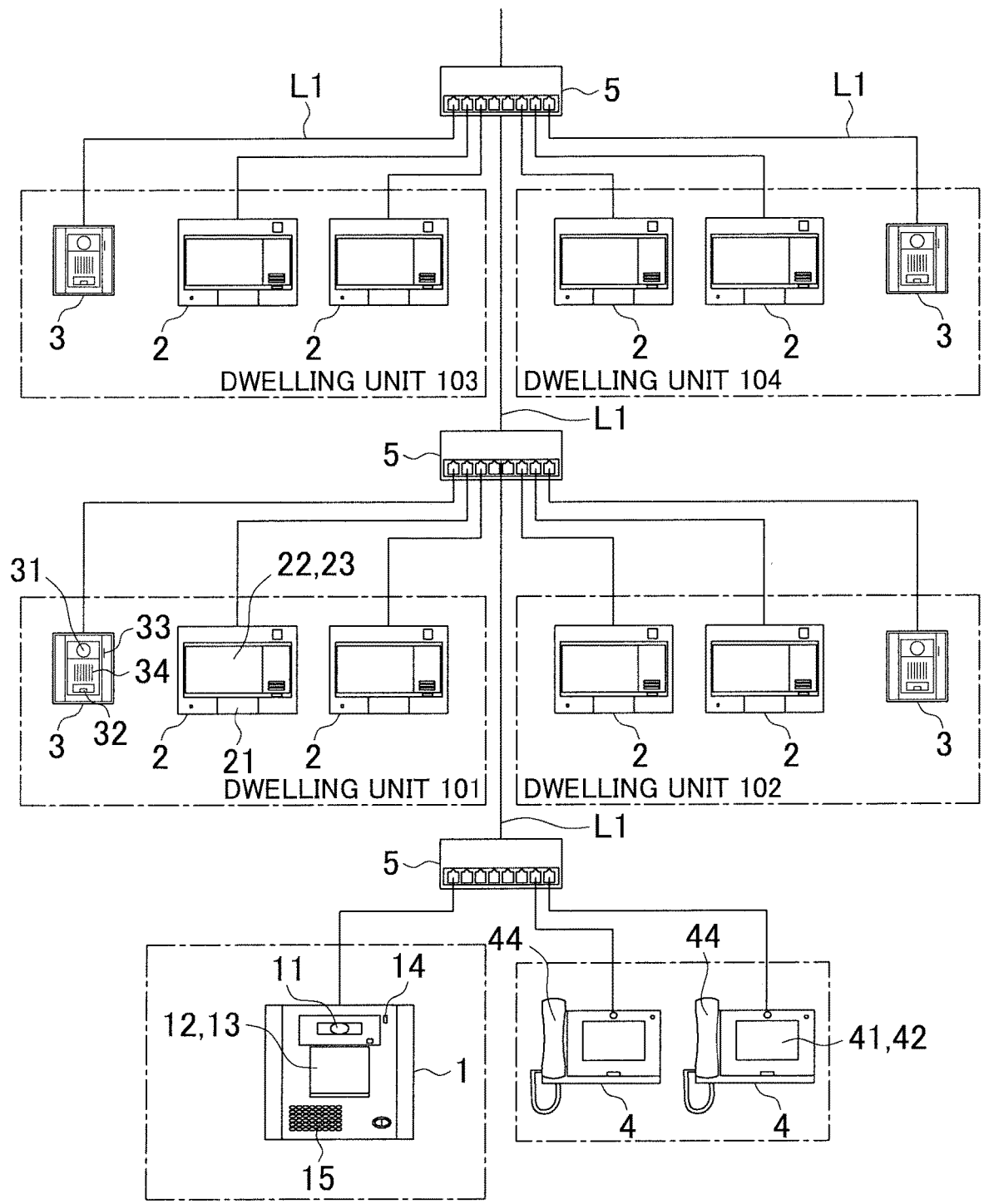
FIG. 1 is a block diagram illustrating an exemplary multiple dwelling house interphone system according to the disclosure.

The following describes embodiments in detail with reference to the drawings. FIG. 1 is a block diagram illustrating an exemplary multiple dwelling house interphone system according to the disclosure. The multiple dwelling house interphone system includes a collective entrance machine 1, dwelling room master devices 2, entrance slave devices 3, management master devices 4, and the like. The collective entrance machine 1 is installed at an entrance of a multiple dwelling house and used by a visitor for calling a dweller. The dwelling room master devices 2 are installed in individual dwelling units and used for responding to the calls from the collective entrance machine 1. The entrance slave devices 3 are installed at entrances of the dwelling units and used for calling the dwellers. The management master devices 4 are installed in a manager room and used for speaking with the dwellers and the like.

Reference character 5 denotes a HUB, the devices are mutually connected by a LAN via communication lines L1, and the communication between the devices is performed by an Internet Protocol (IP). A configuration in which the two dwelling room master devices 2 are installed in each dwelling unit, and the two management master devices 4 are installed is illustrated. By performing the communication between the devices with the IP, addition of the dwelling room master device 2 and the like is facilitated.

The collective entrance machine 1 includes a camera 11, an operation section 12, a display section 13, a microphone 14 and a speaker 15, and the like. The camera 11 obtains an image of a visitor. The operation section 12 is used for selecting or inputting a dwelling unit to be called. The display section 13 displays a calling destination and the like. The microphone 14 and the speaker 15 are used for speaking. The operation section 12 includes a touch panel, and is integrated with the display section 13.

The dwelling room master device 2 includes a speech button 21, a monitor 22, an operation section 23, and the like. The speech button 21 is used for a response operation to the calling. The monitor 22 displays a video image taken by the camera 11 and various information. The operation section 23 includes a touch panel and is integrated with the monitor 22.

The entrance slave device 3 includes a slave device camera 31 for obtaining an image of a visitor, a call button 32 used for calling a dweller, a microphone 33 and a speaker 34 used for speaking, and the like.

Figure 2:
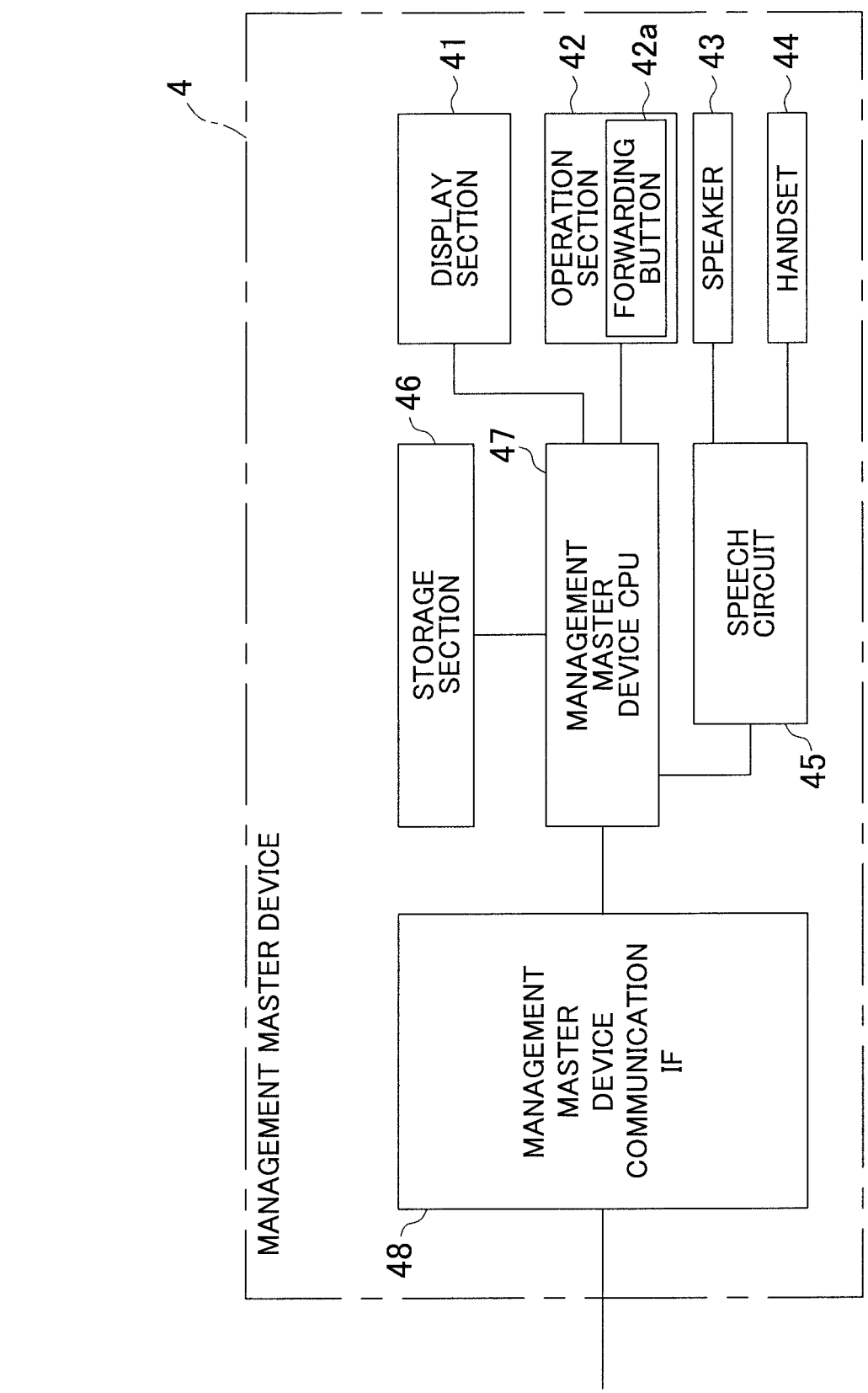
FIG. 2 is a block diagram of a management master device.

FIG. 2 is a block diagram of the management master device 4. As illustrated in FIG. 2, the management master device 4 includes a display section 41, an operation section 42, a speaker 43, a handset 44, a speech circuit 45, a storage section 46, a management master device CPU 47, a management master device communication IF 48, and the like. The display section 41 displays various information in addition to the video image taken by the camera 11. The operation section 42 includes a touch panel. The speaker 43 emits a call sound and the like. The handset 44 is used for speaking. The speech circuit 45 controls the speaker 43 and the handset 44. The storage section 46 stores various information including forwarding information. The management master device CPU 47 controls the management master device 4. The management master device communication IF 48 communicates with the collective entrance machine 1 and the dwelling room master devices 2.

Operations of the interphone system configured as described above are as follows. Note that, because a call from the collective entrance machine 1 in a normal mode without forwarding to the management master device 4 and a response operation by the dwelling room master device 2 or the like are similar to those in the conventional system, the explanations are omitted. Here, a description will be given mainly of the operation in case of a setting in the reception mode in which the calling from the collective entrance machine 1 is uniformly forwarded to the management master device 4. A transfer operation to the reception mode is performed by a predetermined operation of management master device 4.

When the reception mode is set, all the calls from the collective entrance machine 1 are forwarded to the management master device 4. The following describes a case of calling dwelling unit 101 as an example.

While a call signal to the dwelling unit 101 includes an ID of the dwelling unit 101 as a calling destination, an ID of the manager room is added and transmitted as an ID of a transmission destination in the reception mode.

The two management master devices 4 that have received the call signal each perform a calling operation and emit a call sound. A video image of a visitor taken by camera 11 is displayed on the display section 41. Further, the display section 41 displays that a calling source is the collective entrance machine 1 and an original calling destination is dwelling unit 101. Meanwhile, on the collective entrance machine 1 as the calling source, the display section 13 displays that the call is forwarded to the management master device 4.

In response to the call, when the handset 44 of any one of the management master devices 4 is picked up by a manager, a speech path with the collective entrance machine 1 is formed. The other management master device 4 terminates the calling operation in reaction to the response operation of the one management master device 4, and returns to a standby state.

The formation of the speech path allows the manager to speak with the visitor while watching the video image of the visitor displayed on the display section 41 of the management master device 4.

Thus, the manager speaks with the visitor and watches the video image of the visitor displayed on the display section 41, and confirms that the visitor is a visitor to the dwelling unit 101. When a forwarding button 42a disposed at the operation section 42 is operated (touch operation) by the manager, the call signal is re-forwarded to the dwelling room master device 2 of dwelling unit 101. However, when the manager determines the visitor as a suspicious person, the speaking is terminated without operating the forwarding button 42a.

When forwarding button 42*a* is operated, the call signal including ID of the collective entrance machine 1 as the calling source is transmitted to the two dwelling room master devices 2 of dwelling unit 101. In this state, when handset 44 is returned to the main body, the speech path with the collective entrance machine 1 is disconnected, and the information on display for the calling destination on the collective entrance machine 1 changes from the manager room to the dwelling unit 101. The video image taken by the camera 11 is also forwarded by the forwarding operation, and displayed on the monitor 22 of the dwelling room master device 2.

In response to forwarding of the call signal from the management master device 4, when the response operation is performed by one of the dwelling room master devices 2, a speech path with the collective entrance machine 1 is formed. Then, the other dwelling room master device 2 returns to a standby state.

Thus, the dweller performing the response operation can speak with the visitor while watching the video image of the visitor. After the speaking, the speech path is disconnected by a predetermined call ending operation, and the dwelling room master device 2 returns to a standby state.

As described above, since the call from the collective entrance machine 1 is uniformly forwarded to the manager room, the primary response can be performed by the manager, thereby allowing improvement of security such as a measure against a suspicious person. Then, since the call is forwarded from the management master device 4 to the original calling destination by a simple operation of the forwarding button 42*a*, the burden of the manager can be reduced to a minimum without the troublesomeness of inputting the forwarding destination such as a room number.

Additionally, when the response operation is performed by the dwelling room master device 2 of the re-forwarding destination, since the speech path with the collective entrance machine 1 is formed without initial connection with the management master device 4, the dweller receiving the call can smoothly respond to the call from the visitor.

When the call is forwarded in the reception mode, information on the forwarding destination is displayed on the collective entrance machine 1, and subsequently, when the call is re-forwarded to the original calling destination, information on the dwelling unit is displayed. Therefore, the visitor may easily grasp the situation.

Further, since the manager can confirm the visitor through video image even in the forwarded call, it is effective for improving the security. Since the original calling destination is displayed on the management master device 4 to which the call is forwarded, the manager can obtain the calling destination of the visitor, and easily deal with it.

In the above-described embodiment, when the response operation is performed by the dwelling room master device 2 receiving the re-forwarding from the management master device 4, the speech path between the collective entrance machine 1 and the dwelling room master device 2 is formed without forming the speech path with the management master device 4. However, the speech path between the management master device 4 and the dwelling room master device 2 may be formed at first, and subsequently, the speech path between the collective entrance machine 1 and the dwelling room master device may be formed by a predetermined operation of the management master device 4.

While the operation of selecting the calling destination by the dwelling unit number has been indicated, in case the calling destination is a shop or an office in a multiple dwelling house, it is only necessary to provide a configuration in which a shop name or an office name is selected or input on the collective entrance machine 1.

The invention claimed is:

1. A multiple dwelling house interphone system comprising:
   a collective entrance machine installed at an entrance for a visitor to call a dweller;
   a dwelling room master device installed in each dwelling unit for responding to the call from the visitor by the dweller; and
   a management master device installed in a manager room to speak with the visitor or the dweller, wherein the multiple dwelling house interphone system has a reception mode in which a call to any dwelling unit from the collective entrance machine is uniformly transmitted to the management master device, and
   the management master device includes:
      a forwarding button that re-forwards a call in the reception mode to an original calling destination; and
      a forwarding control section that re-forwards the call to the dwelling room master device of a dwelling unit as the original calling destination when the forwarding button is operated in a state where a speech path is formed with the collective entrance machine in response to the call forwarded in the reception mode,
   wherein the collective entrance machine includes a collective entrance machine display section that displays a calling destination,
   wherein, in the state where the call from the collective entrance machine is forwarded to the management master device, the collective entrance machine display section displays that the call is forwarded to the management master device, and
   wherein when the call is re-forwarded from the management master device to the original calling destination, dwelling unit information of the original calling destination is displayed.

2. The multiple dwelling house interphone system according to claim 1, wherein when a response operation is performed by the dwelling room master device to which the call has been re-forwarded, the forwarding control section disconnects the speech path between the collective entrance machine and the management master device and forms a speech path between the dwelling room master device of a re-forwarding destination and the collective entrance machine.

3. The multiple dwelling house interphone system according to claim 1, wherein the collective entrance machine includes a camera that takes a video image of the visitor, and the management master device includes a monitor that displays the video image taken by the camera, and
   in the management master device to which the call has been forwarded in the reception mode, the video image taken by the camera is displayed on the monitor.

4. The multiple dwelling house interphone system according to claim 1, wherein the management master device includes a display section that displays the dwelling unit information of the original calling destination when the call is forwarded in the reception mode.

5. The multiple dwelling house interphone system according to claim 2, wherein the collective entrance machine includes a camera that takes a video image of the visitor, and the management master device includes a monitor that displays the video image taken by the camera, and
   in the management master device to which the call has been forwarded in the reception mode, the video image taken by the camera is displayed on the monitor.

6. The multiple dwelling house interphone system according to claim 1, wherein the collective entrance machine includes a camera that takes a video image of the visitor, and the management master device includes a monitor that displays the video image taken by the camera, and in the management master device to which the call has been forwarded in the reception mode, the video image taken by the camera is displayed on the monitor.

7. The multiple dwelling house interphone system according to claim 2, wherein the management master device includes a display section that displays the dwelling unit information of the original calling destination when the call is forwarded in the reception mode.

8. The multiple dwelling house interphone system according to claim 1, wherein the management master device includes a display section that displays the dwelling unit information of the original calling destination when the call is forwarded in the reception mode.

9. The multiple dwelling house interphone system according to claim 3, wherein the management master device includes a display section that displays the dwelling unit information of the original calling destination when the call is forwarded in the reception mode.

* * * * *